United States Patent
Tsubakimoto et al.

(10) Patent No.: US 9,554,007 B2
(45) Date of Patent: Jan. 24, 2017

(54) IMAGE FORMING APPARATUS AND METHOD FOR SECURING CARRIAGE

(71) Applicant: CANON KABUSHIKI KAISHA, Tokyo (JP)

(72) Inventors: Yasuhito Tsubakimoto, Tokyo (JP); Kazuhisa Kawakami, Yokohama (JP); Masaya Shimmachi, Kawasaki (JP); Kaneto Tokuyama, Tokyo (JP); Toshiaki Harada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 877 days.

(21) Appl. No.: 13/932,116

(22) Filed: Jul. 1, 2013

(65) Prior Publication Data

US 2014/0010584 A1 Jan. 9, 2014

(30) Foreign Application Priority Data

Jul. 9, 2012 (JP) .................. 2012-153449

(51) Int. Cl.
*B41J 29/02* (2006.01)
*H04N 1/00* (2006.01)
*H04N 1/12* (2006.01)

(52) U.S. Cl.
CPC .......... *H04N 1/00559* (2013.01); *H04N 1/128* (2013.01); *H04N 2201/0082* (2013.01); *H04N 2201/0444* (2013.01); *Y10T 403/1608* (2015.01)

(58) Field of Classification Search
None
See application file for complete search history.

(56) References Cited

U.S. PATENT DOCUMENTS

| 5,158,382 | A | 10/1992 | Baron |
| 5,719,612 | A | 2/1998 | Hirakue |
| 5,764,265 | A * | 6/1998 | Minegishi ................ B41J 29/02 347/108 |
| 2001/0010582 | A1 | 8/2001 | Hayashi |
| 2003/0063330 | A1 | 4/2003 | Hayashi |
| 2012/0056960 | A1 * | 3/2012 | Williams ................ B41J 29/13 347/108 |

(Continued)

FOREIGN PATENT DOCUMENTS

| CN | 87100952 A | 9/1988 |
| CN | 100473102 C | 3/2009 |

(Continued)

*Primary Examiner* — Kristal Feggins
(74) *Attorney, Agent, or Firm* — Canon U.S.A., Inc., IP Division

(57) ABSTRACT

An image forming apparatus includes a frame in which a carriage configured to reciprocate along a predetermined direction is disposed, and a unit disposed to be openable with respect to the frame. A first engaging portion is formed on the image forming apparatus. The image forming apparatus is capable of restricting a movement of the carriage at least in the predetermined direction with use of a securing component including a second engaging portion engageable with the first engaging portion. When the securing component is attached to the carriage, and then the unit is closed with the first engaging portion and the second engaging portion engaging with each other, the securing component is sandwiched and fixed between the frame and the unit.

12 Claims, 10 Drawing Sheets

(56) References Cited

U.S. PATENT DOCUMENTS

| | | | |
|---|---|---|---|
| 2013/0050381 A1* | 2/2013 | Okumura | B41J 29/02 347/108 |
| 2014/0009553 A1* | 1/2014 | Kawakami | B41J 29/02 347/108 |

FOREIGN PATENT DOCUMENTS

| | | |
|---|---|---|
| JP | S62-063162 U | 4/1987 |
| JP | 05-116436 A | 5/1993 |
| JP | H05-155031 A | 6/1993 |
| JP | 5-193237 A | 8/1993 |
| JP | 2001-063193 A | 3/2001 |

* cited by examiner

IMAGE FORMING APPARATUS AND METHOD FOR SECURING CARRIAGE

BACKGROUND OF THE INVENTION

Field of the Invention

The present disclosure relates to an image forming apparatus including a carriage therein, and a method for securing the carriage.

Description of the Related Art

Image forming apparatuses that include a reciprocably movable carriage, such as printers and image scanners, are provided with some measures for preventing the carriage within the apparatus from moving and being damaged due to an impact applied during transportation after shipment from a factory. One of preventive methods therefor is to secure the carriage within the image forming apparatus with use of an adhesive tape. When a user sets up the image forming apparatus after unpacking, the user peels off the tape to remove it.

As another method, Japanese Patent Application Laid-Open No. 5-193237 discusses a method for holding a carriage using a holding member instead of using a tape.

The method for securing the carriage using the tape has such a problem that the adhesive force of the tape is weakened according to a change over time, reducing the capability to hold the carriage. Further, this method also has such a problem that a user has to take time and trouble to deal with the peeled-off tape.

Further, according to the configuration discussed in the above-described Japanese Patent Application Laid-Open No. 5-193237, when a strong impact force is applied to the carriage during transportation, a hook portion of the holding member may be deformed, thereby releasing an engagement state of the holding member. Further, when a user removes the holding member, the user has to unhook the hook portion of the holding member. Therefore, this method involves such a problem that, especially, if the rigidity of the hook portion is enhanced to improve the holding performance of the holding member, this leads to a reduction in the operability of the hook portion.

SUMMARY OF THE INVENTION

The present disclosure is directed to an image forming apparatus and a method for securing a carriage, according to which the carriage is restricted from moving and is firmly secured even when an impact is applied to the carriage during transportation, while a carriage securing component can be easily removed.

According to an aspect disclosed herein, an image forming apparatus includes a carriage configured to reciprocate along a predetermined direction, a frame in which the carriage is disposed, and a unit which is openable with respect to the frame. A first engaging portion is formed on the image forming apparatus. The image forming apparatus is capable of restricting a movement of the carriage at least in the predetermined direction with use of a securing component including a second engaging portion engageable with the first engaging portion. When the securing component is attached to the carriage, and then the unit is closed with the first engaging portion and the second engaging portion engaging with each other, the securing component is sandwiched and fixed between the frame and the unit.

According to exemplary embodiments of the present disclosure, even when a strong impact is applied during transportation of the image forming apparatus, it is possible to restrict a movement of the carriage and prevent the carriage from being damaged, since the securing component is firmly fixed to the first engaging portion as long as the unit is closed. Then, when a user works on setting up the image forming apparatus after the transportation, the user can easily remove the securing component only by opening the unit, so that the user can set up the image forming apparatus more conveniently and correctly.

Further features of the present invention will become apparent from the following description of exemplary embodiments with reference to the attached drawings.

DESCRIPTION OF THE EMBODIMENTS

Figure 1:
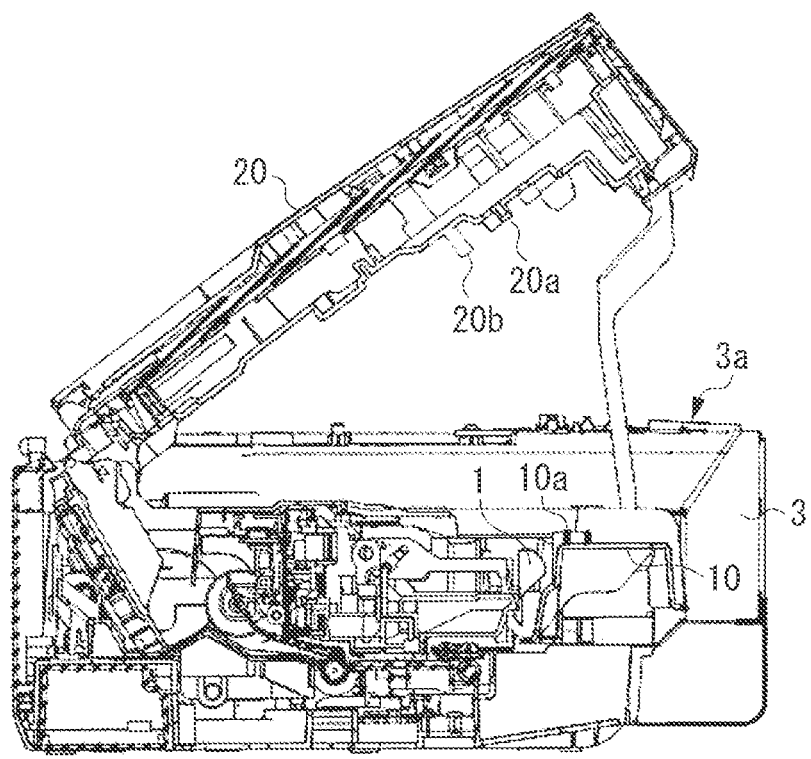
FIG. 1 is a cross-sectional view of an image forming apparatus according to a first exemplary embodiment of the present invention, illustrating the image forming apparatus with a scanner unit opened.

Various exemplary embodiments, features, and aspects of the invention will be described in detail below with reference to the drawings.

Like or analogous elements and/or components in each of exemplary embodiments are identified by like reference numerals throughout the drawings. Further, a reference numeral with an alphabet attached thereto indicates a part of the component denoted by the reference numeral alone.

Figure 2:
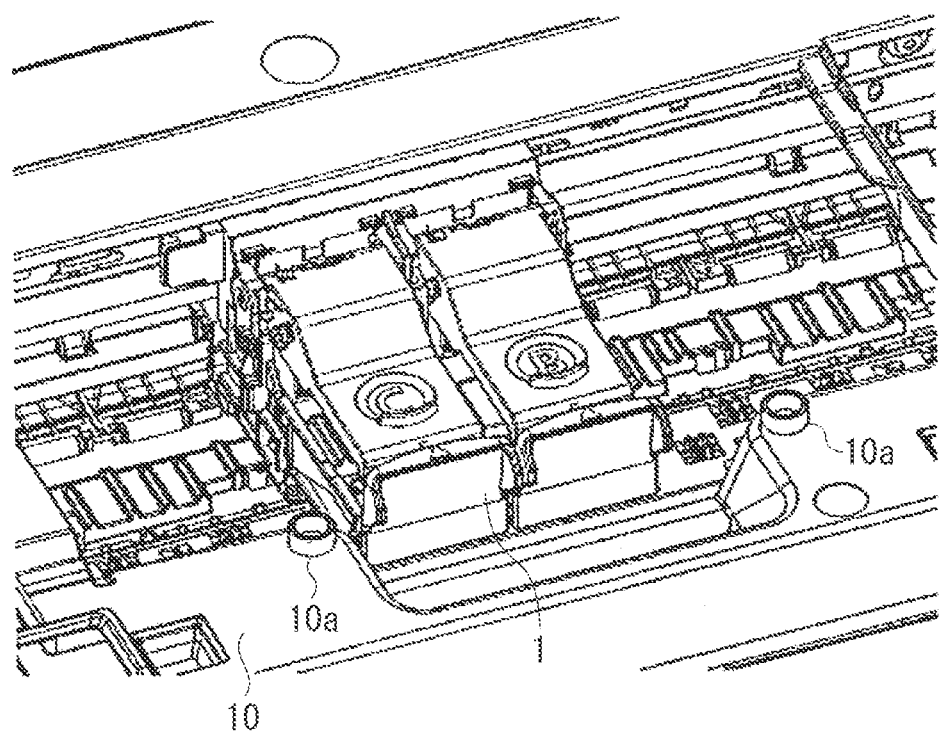
FIG. 2 is a perspective view illustrating an initial position of a carriage and the vicinity thereof in the image forming apparatus according to the first exemplary embodiment when the image forming apparatus is shipped.

FIG. 1 is a sectional side view illustrating an image forming apparatus (a multifunction printer) according to a first exemplary embodiment. FIG. 2 is a perspective view illustrating an initial position of a carriage and the vicinity thereof when the image forming apparatus is shipped. The image forming apparatus according to the present exemplary embodiment includes a carriage 1 disposed so as to be reciprocably movable along a predetermined direction while holding a recording head for forming an image on a sheet as a recording medium.

FIG. 1 illustrates the image forming apparatus with a scanner unit 20 opened with respect to an opening of a frame. The image forming apparatus includes a frame 3, which includes an opening 3a for allowing the carriage 1 disposed within the image forming apparatus to be exposed to the outside of the image forming apparatus, and a scanner unit 20, which is a cover unit disposed so as to be able to open and close the opening 3a. Further, the frame 3 includes a frame 10 as a structure for supporting the carriage 1, the scanner unit 20, and others. Thus the scanner unit 20 is openable (rotatably opened and closed) with respect to the frame 10. During transportation of the image forming apparatus, a carriage securing sheet 30 (refer to FIG. 3) as a carriage securing component is attached inside the apparatus for regulating the position of the carriage 1.

In the following description, the scanner unit 20 will be described as a member corresponding to the cover unit. However, strictly speaking, the scanner unit 20 is integrally constructed with an open/close cover that is actually the cover unit.

A pair of cylindrical protrusions 10a is formed on the frame 10. The pair of cylindrical protrusions 10a is located near the initial position of the carriage 1, and serves as a first engaging portion configured to engage with the carriage securing sheet 30 and the scanner unit 20. Further, the carriage securing sheet 30 includes a pair of engaging holes 30a that serves as a second engaging portion configured to engage with the cylindrical protrusions 10a. Further, a pair of protrusions 20a is formed on the scanner unit 20. The pair of protrusions 20a serves as a third engaging portion configured to engage with the cylindrical protrusions 10a of the frame 10 when the opening 3a is closed. These first, second, and third engaging portions engage with one another on at least two positions spaced-apart in the predetermined direction in which the carriage 1 moves.

Figure 3:
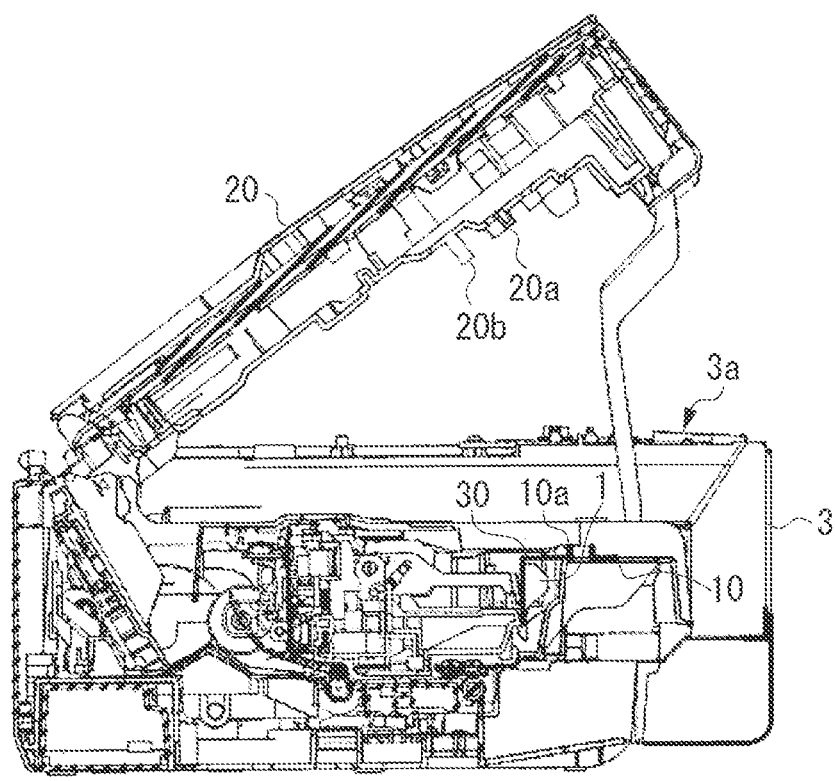
FIG. 3 is a cross-sectional view illustrating the image forming apparatus according to the first exemplary embodiment with a carriage securing sheet mounted thereon.

FIG. 3 is a cross-sectional view illustrating the image forming apparatus with the carriage securing sheet 30 mounted on the frame 10 of the image forming apparatus. A pressing protrusion 20b is formed on the scanner unit 20. The pressing protrusion 20b serves as a pressing portion for pressing an end of the carriage securing sheet 30 mounted on the frame 10 against the carriage 1 toward the frame 10.

Figure 4A:
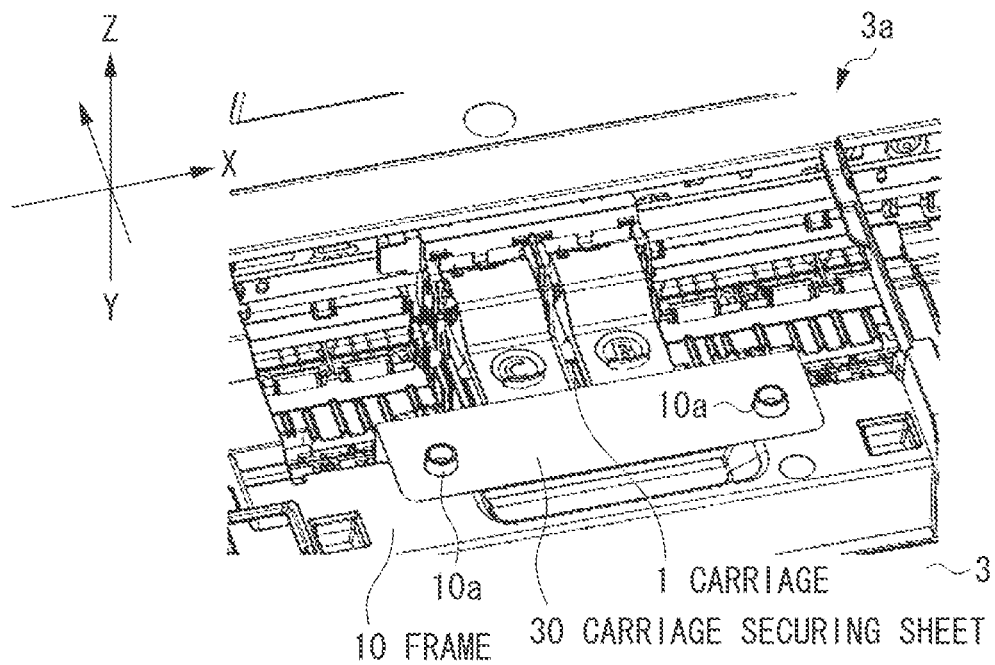
FIG. 4A is a perspective view illustrating the vicinity of the carriage securing sheet illustrated in FIG. 3 in the image forming apparatus according to the first exemplary embodiment.
Figure 4B:
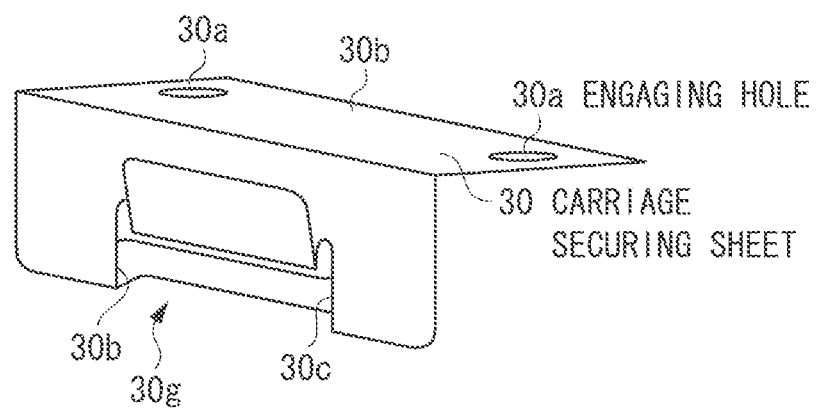
FIG. 4B is a perspective view illustrating the carriage securing sheet illustrated in FIG. 4A.

FIG. 4A is a perspective view illustrating the vicinity of the carriage 1 with the carriage securing sheet 30 mounted on the frame 10. FIG. 4B is a perspective view illustrating the carriage securing sheet 30.

The carriage securing sheet 30 for securing the carriage 1 so as to restrict a movement of the carriage 1 during transportation is prepared separately from the main body of the image forming apparatus. The carriage securing sheet 30 includes a flat plate portion 30b extending in parallel with an X-Y plane illustrated in FIG. 4A, and the pair of engaging holes 30a formed at the flat plate portion 30b.

The carriage securing sheet 30 engages with the frame 10 by insertions of the pair of cylindrical protrusions 10a (the first engaging portion) formed on the frame 10 into the pair of engaging holes 30a (the second engaging portion). The carriage securing sheet 30 includes edges 30c and 30d of an opening 30g formed at an inner side of the carriage securing sheet 30 as portions to be attached to the carriage 1. The carriage 1 is secured so as not to move during transportation by the carriage securing sheet 30, by being supported at both sides of the carriage 1 in the movement direction of the carriage 1 by the edges 30c and 30d formed at the carriage securing sheet 30.

The engaging holes 30a of the carriage securing sheet 30 are not limited to the shape independently formed at an inner side of the flat plate portion 30b of the carriage securing sheet 30 as described above. For example, the engaging holes 30a may be formed into a cutout shape in which part of the engaging hole 30a is connected to an outer perimeter edge of the flat plate portion 30b of the carriage securing sheet 30.

Figure 5:
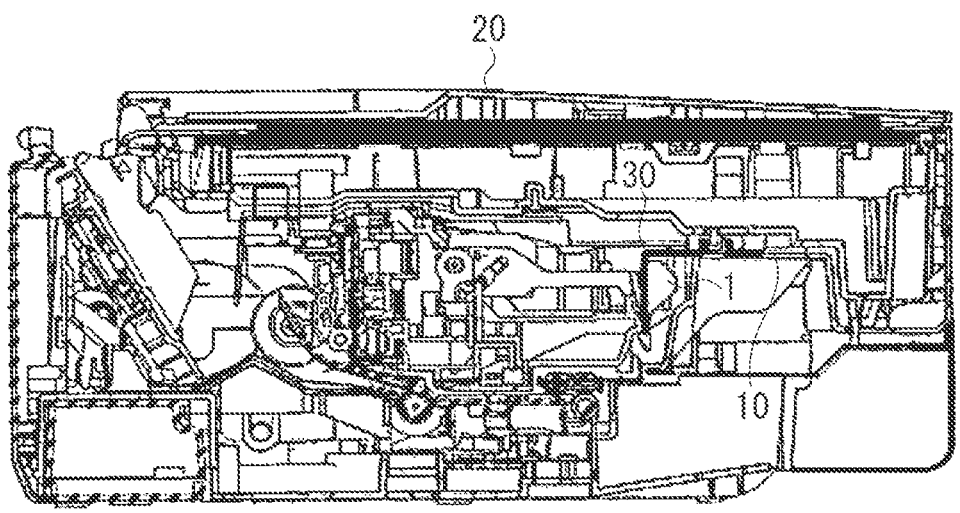
FIG. 5 is a cross-sectional view illustrating the image forming apparatus according to the first exemplary embodiment with the carriage securing sheet mounted thereon and the scanner unit closed.
Figure 6:
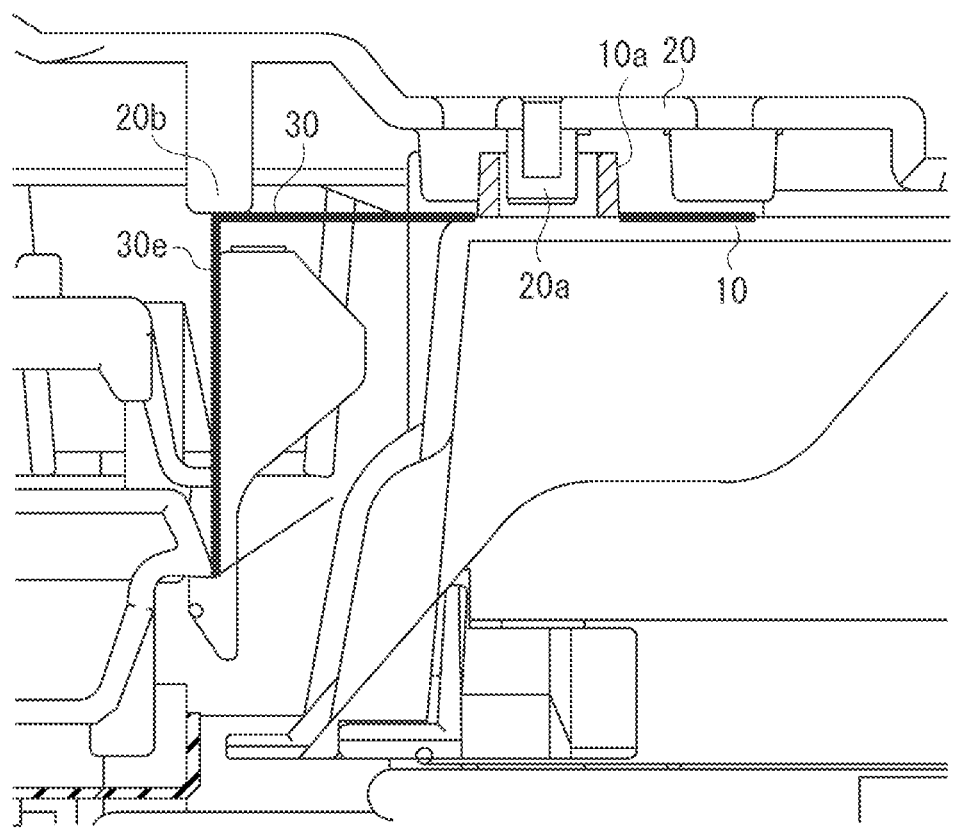
FIG. 6 is an enlarged cross-sectional view illustrating the vicinity of the carriage securing sheet illustrated in FIG. 5 in the image forming apparatus according to the first exemplary embodiment.

FIG. 5 is a cross-sectional view illustrating the image forming apparatus with the opening 3a closed by the scanner unit 20. Further, FIG. 6 is a cross-sectional view illustrating main portions in FIG. 5 in an enlarged manner. FIG. 6 illustrates the cylindrical protrusion 10a of the frame 10, the protrusion 20a of the scanner unit 20, the positional relationship of the carriage securing sheet 30, and the detailed shape of the carriage securing sheet 30.

As illustrated in FIGS. 5 and 6, in a state when the image forming apparatus is shipped, the carriage securing sheet 30 is fixed while holding the carriage 1, with a thickness direction (a vertical direction) of the flat plate portion 30b sandwiched between the frame 10 and the scanner unit 20. Concavo-convex engagement is established between the cylindrical protrusions 10a (the first engaging portion) as concaved protrusions of the frame 10, which engage with the engaging holes 30a (the second engaging portion) of the carriage securing sheet 30, and the convexed protrusions 20a (the third engaging portion) of the scanner unit 20. Due to this engagement, the second engaging portion of the carriage securing sheet 30 cannot be removed from the first engaging portion and the third engaging portion that engage with each other. This state firmly restricts the degree of freedom of the carriage securing sheet 30 in the vertical direction (in a Z direction illustrated in FIG. 4A).

Further, the carriage securing sheet 30 includes the pair of engaging holes 30a, which are engaging holes spaced apart in the movement direction of the carriage 1, whereby the degree of freedom is firmly restricted in a rotational direction within the X-Y plane illustrated in FIG. 4A.

Further, the lengths of the cylindrical protrusions 10a and the protrusions 20a in a protruding direction are in a relationship to overlap and engage with each other. Therefore, the degree of freedom can be easily kept restricted, even if the carriage securing sheet 30 floats up to be away from the frame 10 and moves in a direction causing the cylindrical protrusions 10a to disengage from the engaging holes 30a. Further, even if the cylindrical protrusions 10a of the frame 10 disengages from the engaging holes 30a, the degree of freedom of the carriage securing sheet 30 remains restricted due to the engagement between the engaging holes 30a and the protrusions 20a of the scanner unit 20.

Further, when the carriage 1 is about to move under an external force during transportation, the external force acts on the carriage securing sheet 30 for generation of a twist of the entire carriage securing sheet 30. However, according to the present exemplary embodiment, the carriage securing sheet 30 is held by the pressing protrusion 20b disposed above the flat plate portion 30b of the carriage securing sheet 30, whereby the twist is prevented from being generated by the pressing protrusion 20b. As a result, the carriage securing sheet 30 can sufficiently hold the carriage 1 even without being fixed with use of any tape, since the degree of freedom is restricted by the shapes of the component members around the carriage securing sheet 30.

Further, when a user removes the carriage securing sheet 30, the scanner unit 20, which restricts the degree of freedom of the carriage securing sheet 30, is opened, releasing the engagement state between the scanner unit 20 and the frame 10. Therefore, the degree of freedom is given to the carriage securing sheet 30 to allow the carriage securing sheet 30 to be easily removed without being deformed.

Further, as illustrated in FIG. 6, the carriage securing sheet 30 includes a bent portion 30e formed by bending a sheet material along a bending line. The direction in which the bending line extends is substantially in parallel with the movement direction of the carriage 1, in such a state that the carriage securing sheet 30 engages with the cylindrical protrusions 10a. In this way, the carriage securing sheet 30 includes the bent portion 30e bent in a direction perpendicular to (intersecting with) the movement direction of the carriage 1, thereby increasing a section modulus in the movement direction of the carriage 1. Therefore, the carriage securing sheet 30 can sufficiently hold and restrict the carriage 1, even if a member formed into a thin sheet is used for the carriage securing sheet 30.

Figure 7:
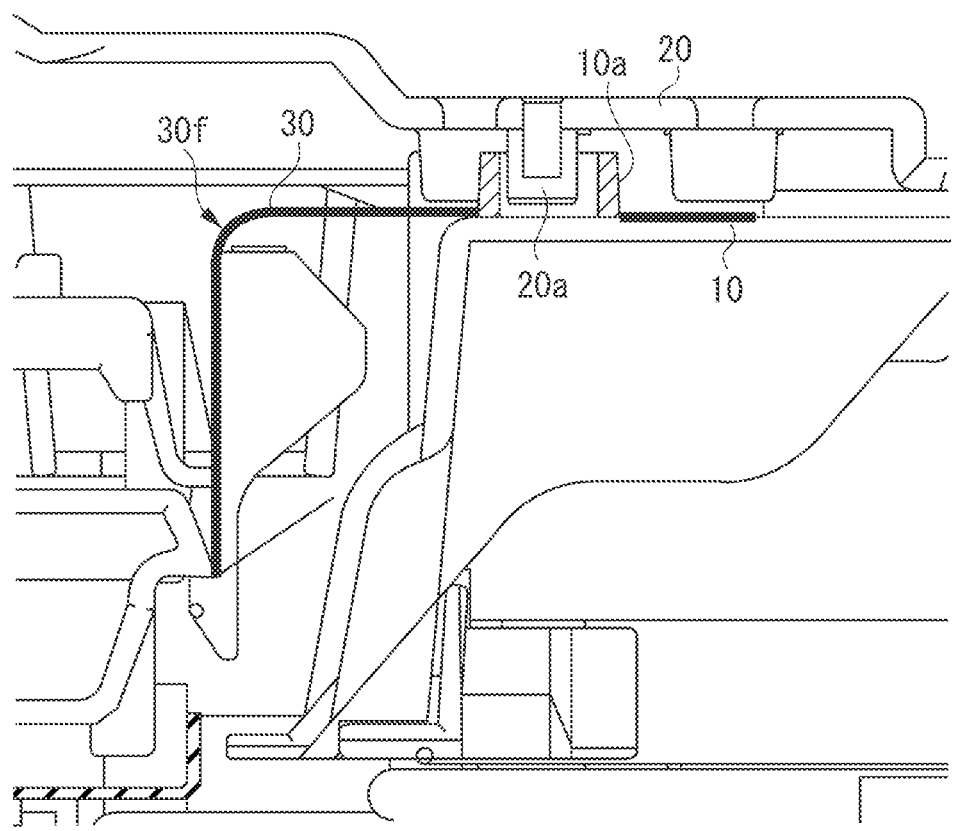
FIG. 7 is a cross-sectional view of another carriage securing sheet according to the first exemplary embodiment, illustrating how the carriage securing sheet as a flat plate is bent and mounted on the image forming apparatus.

In the present exemplary embodiment, the carriage securing sheet 30 illustrated in FIGS. 3 to 6 includes the bent portion 30e. However, the carriage securing sheet 30 does not necessarily have to be shaped to have the bent portion 30e, since a similar effect can be achieved by any shape capable of realizing a large section modulus. For example, as illustrated in FIG. 7, the carriage securing sheet 30 without the bent portion 30e may have a shape that will be circularly bent like a curved portion 30f when being mounted, so as to increase the section modulus when being mounted on the image forming apparatus.

The present exemplary embodiment is configured in such a manner that the concaved cylindrical protrusions 10a are formed on the frame 10, the convexed protrusions 20a are formed on the scanner unit 20, and the protrusions 20a are inserted into the cylindrical protrusions 10a to establish concavo-convex engagement. However, the present exemplary embodiment is not limited to this configuration. The present exemplary embodiment may be configured in such a manner that the shapes of protrusions formed on the scanner unit 20 are formed as cylindrical protrusions having larger inner diameters than the diameters of the cylindrical protrusions 10a formed on the frame 10, and these protrusions of the scanner unit 20 engage with the outer surfaces of the cylindrical protrusions 10a, instead of engaging with the inner surfaces of the cylindrical protrusions 10a.

Figure 8A:
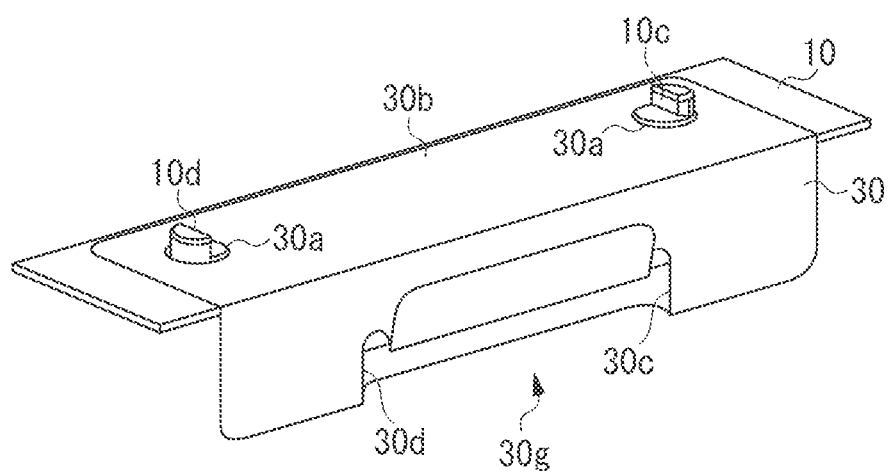
FIG. 8A is a perspective view illustrating another engagement structure between the scanner unit and a frame according to the first exemplary embodiment.
Figure 8B:
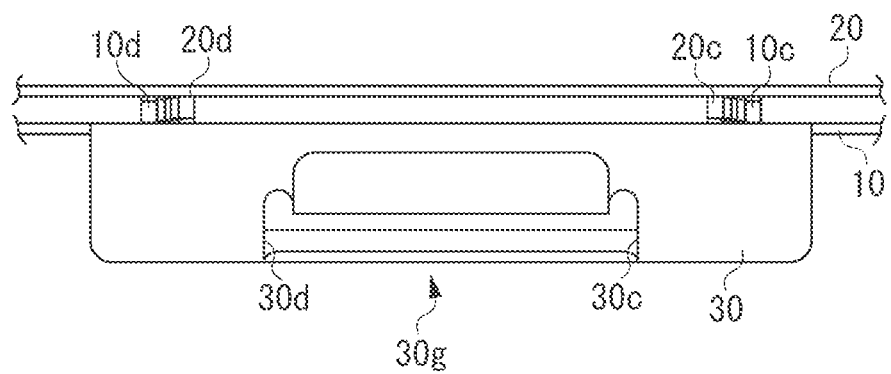
FIG. 8B is a side view illustrating an engagement relationship of an engaging portion illustrated in FIG. 8A.

Further, a similar effect can be acquired, even if the cylindrical protrusions 10a and the protrusions 20a illustrated in FIGS. 1 to 7 have shapes illustrated in FIGS. 8A and 8B. As illustrated in FIG. 8A, a pair of protrusions 10c and 10d having semi-cylindrically shaped tips is formed on the frame 10. As illustrated in FIG. 8B, a pair of protrusions 20c and 20d having semi-cylindrically shaped tips is formed on the scanner unit 20. As illustrated in FIG. 8B, the protrusions 10c and 10d of the frame 10 engage with the protrusions 20c and 20d of the scanner unit 20, with the concaves and convexes thereof engaging with each other while overlapping with each other in a height direction (the protruding direction).

Even when a strong impact is applied during transportation of the image forming apparatus, the carriage securing sheet 30 is firmly fixed within the image forming apparatus while restricting a movement of the carriage 1, as long as the scanner unit 20 closes the opening 3a. Therefore, it is possible to prevent the carriage 1 from being, for example, damaged by being forcedly moved by an external force, and therefore possible to robustly protect the carriage 1 during the transportation.

Further, when a user removes the carriage securing sheet 30 after the transportation, the user can release the sandwiched state of the carriage securing sheet 30 between the scanner unit 20 and the frame 10 only by opening the scanner unit 20. Therefore, the user can easily remove the carriage securing sheet 30 and can set up the image forming apparatus more conveniently and correctly.

Figure 9A:
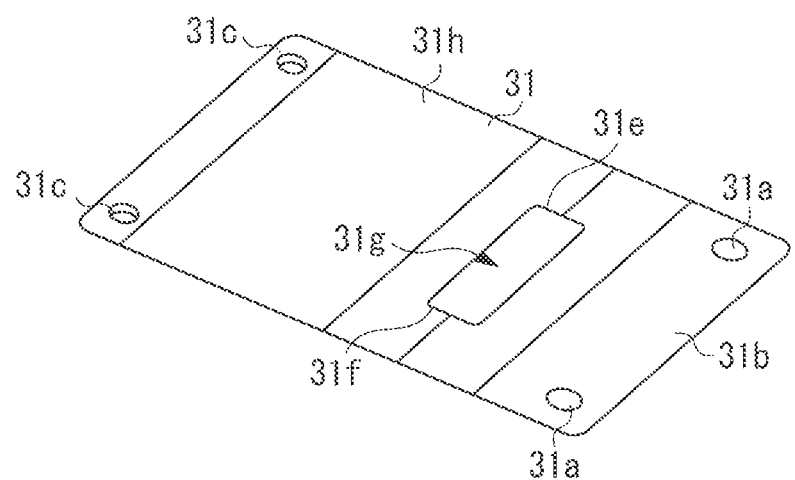
FIGS. 9A and 9B are perspective views illustrating a carriage securing sheet according to a second exemplary embodiment of the present invention.
Figure 9B:
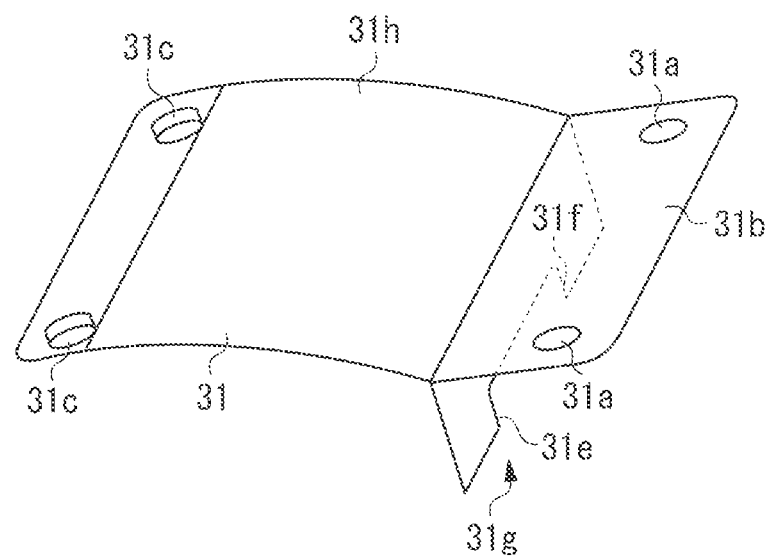
Figure 10:
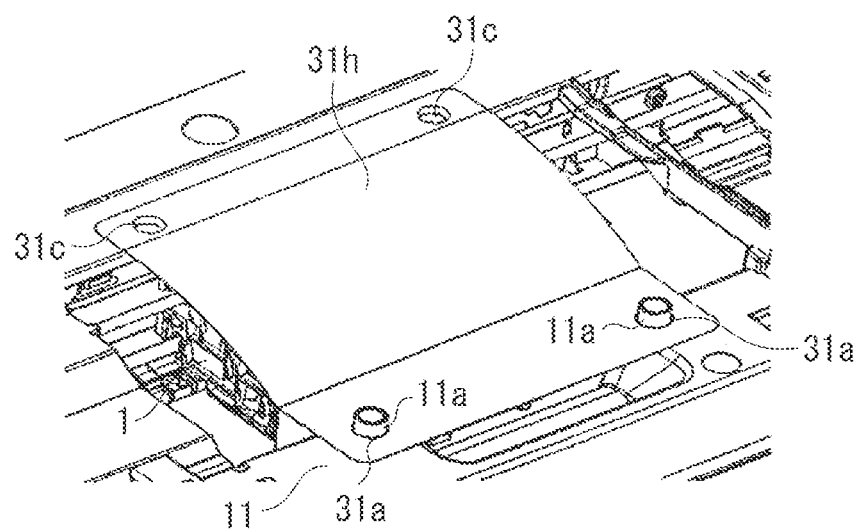
FIG. 10 is a perspective view illustrating how the carriage securing sheet according to the second exemplary embodiment is mounted on the image forming apparatus.

FIGS. 9A and 9B are perspective views illustrating another configuration example of the carriage securing sheet. Further, FIG. 10 is a perspective view illustrating how the carriage securing sheet illustrated in FIGS. 9A and 9B is mounted on the image forming apparatus. FIG. 9A illustrates a carriage securing sheet 31 developed into a flat plate before being bent. FIG. 9B is a perspective view illustrating how the carriage securing sheet 31 illustrated in FIG. 9A is bent to be mounted on the image forming apparatus.

A pair of holes 31a (the second engaging portion) is formed at a flat plate portion 31b of the carriage securing sheet 31. The pair of holes 31a is configured to engage with protrusions (the first engaging portion) of a frame 11. Further, the carriage securing sheet 31 includes a cover portion 31h. The cover portion 31h extends in the direction perpendicular to (intersecting with) the movement direction of the carriage 1, and is sized to entirely cover an upper side (a head portion) of the carriage 1. A pair of convex portions 31c (the second engaging portion) is formed on the cover portion 31h of the carriage securing sheet 31. The convex portions 31c are formed by thermal deformation. The convex portions 31c are also concave portions as viewed from the front surface of the carriage securing sheet 31, and do not have through-holes formed at the tips thereof. Further, an opening 31g for holding the carriage 1 is formed at the carriage securing sheet 31. Sides 31e and 31f of the opening 31g at an inner side of the carriage securing sheet 31 are edges that serve as a pair of engaging claws that will engage with the both sides of the carriage 1 in the movement direction of the carriage 1.

FIG. 10 is a perspective view illustrating how the carriage securing sheet 31 illustrated in FIGS. 9A and 9B is mounted on the image forming apparatus. As illustrated in FIG. 10, the frame 11 includes a pair of cylindrical protrusions 11a configured to be inserted into the holes 31a formed at the carriage securing sheet 31 to engage therewith. Further, a pair of engaging holes or concave portions (the first engaging portion) is formed at the frame 11. These engaging holes serve as engaging portions in which the pair of convex portions 31c formed on the cover portion 31h of the carriage securing sheet 31 is inserted to engage therewith. Alternatively, the convex portions 31c may protrude in an opposite direction, and the first engaging portion formed on the frame 11 may be configured as protrusions, so that they can engage with each other. In other words, in the above-described first exemplary embodiment, the second engaging portion formed on the carriage securing sheet 30 is embodied by holes, while in a second exemplary embodiment, part of the second engaging portion is not embodied by holes but embodied by convex portions (or concave portions).

Although not illustrated, the other components in the present exemplary embodiment, such as the scanner unit 20 and the protrusions 20a of the scanner unit 20, are configured similar to those in the first exemplary embodiment, and, therefore, the descriptions thereof will be omitted here.

The carriage securing sheet 31 according to the present exemplary embodiment has a function of positioning the carriage 1 relative to the frame 11 in the movement direction of the carriage 1 and the direction intersecting with the movement direction of the carriage 1 (the longitudinal and lateral directions of the image forming apparatus). In other words, the first engaging portion and the second engaging portion are provided at both sides across the carriage 1. This arrangement enables the carriage securing sheet 31 to stably hold the carriage 1, especially, even if the carriage 1 has a large mass.

The above-described carriage securing sheets 30 and 31 can be fabricated from, for example, a sheet material made of a resin material such as a polyethylene terephthalate (PET) sheet. The mechanical strength required for the carriage securing sheets 30 and 31 varies depending on conditions such as the specification of the image forming apparatus and the mass of the carriage 1, whereby the material can be arbitrarily selected according to the conditions. For example, the carriage securing sheets 30 and 31 may be fabricated from a paper sheet material. Further, in a case where the carriage securing sheet 30 or 31 should hold a carriage with a large mass, the carriage securing sheet 30 or 31 can be desirably molded by injection molding with use of a resin material to increase the mechanical strength of the carriage securing sheet 30 or 31.

In this manner, according to the present exemplary embodiment, even when a strong impact is applied during transportation of the image forming apparatus, the carriage securing component 30 or 31, which secures the carriage 1, can be firmly fixed within the image forming apparatus, as long as the cover unit is closed. Therefore, the carriage 1 can be prevented from being, for example, damaged due to a forced movement of the carriage 1, so that the image forming apparatus can be robustly protected during the transportation.

Further, when a user works on setting up the image forming apparatus after the transportation, the user can easily remove the carriage securing component 30 or 31 only by displacing the scanner unit 20 to open the opening 3a. Therefore, the user can set up the image forming apparatus more conveniently and correctly.

The above-described exemplary embodiments of the present disclosure have been described based on the configuration that includes the scanner unit 20 as an example. However, for example, the image forming apparatus may be a single function printer having only the image forming function. In this case, protrusions similar to the above-described ones are formed on an open/close cover for opening and closing an opening of a frame. Further, not only in the case of a printer that forms an image on a sheet by a recording head, but also even in the case of an image scanner that reads an image while moving a carriage on which a reading head including an image sensor is mounted, the carriage can be secured during transportation in a similar manner. While the printer forms an image on a sheet, the image scanner reads an image on an original document to form electronic image data, whereby both are referred to as an image forming apparatus in the present disclosure.

While the present invention has been described with reference to exemplary embodiments, it is to be understood that the invention is not limited to the disclosed exemplary embodiments. The scope of the following claims is to be accorded the broadest interpretation to encompass all modifications, equivalent structures, and functions.

This application claims the benefit of Japanese Patent Application No. 2012-153449 filed Jul. 9, 2012, which is hereby incorporated by reference herein in its entirety.

What is claimed is:

1. An image forming apparatus comprising:
a carriage configured to reciprocate along a predetermined direction;
a frame in which the carriage is disposed; and
a unit that is openable with respect to the frame,
wherein a first engaging portion is formed on the image forming apparatus,
wherein the image forming apparatus restricts a movement of the carriage at least in the predetermined direction with use of a securing component having a second engaging portion engageable with the first engaging portion, and
wherein, when the securing component is attached to the carriage, and then the unit is closed with the first engaging portion and the second engaging portion engaging with each other, the securing component is arranged and fixed between the frame and the unit.

2. The image forming apparatus according to claim 1, wherein the first engaging portion and the second engaging portion engage with each other on at least two positions spaced apart in the predetermined direction.

3. The image forming apparatus according to claim 1, wherein the first engaging portion has a protrusion, and the second engaging portion has a hole sized to allow the protrusion to be inserted therein.

4. The image forming apparatus according to claim 3, wherein the first engaging portion is formed on a structure for supporting the carriage,
wherein the unit includes a third engaging portion configured to engage with the first engaging portion when the unit is closed, and
wherein when the second engaging portion of the securing component is in engagement with the first engaging portion, the second engaging portion is prevented from disengaging from the first engaging portion, in such a state that the unit is closed and the first engaging portion and the third engaging portion engage with each other.

5. The image forming apparatus according to claim 4, wherein the first engaging portion and the third engaging portion each have a shape for establishing concavo-convex engagement therebetween.

6. The image forming apparatus according to claim 1, wherein the unit includes a pressing portion configured to press the securing component against the carriage when the unit is closed.

7. The image forming apparatus according to claim 1, wherein the securing component has a structure in which a sheet material is bent along a bending line, and
wherein a direction in which the bending line extends is substantially parallel with the predetermined direction, in such a state that the second engaging portion of the securing component engages with the first engaging portion.

8. The image forming apparatus according to claim 7, wherein a portion of the securing component to be attached to the carriage includes a pair of claws configured to engage with both ends of the carriage in the predetermined direction, respectively.

9. The image forming apparatus according to claim 1, wherein the securing component is sized to cover a head portion of the carriage, and wherein the first engaging portion and the second engaging portion are provided at both sides across the carriage.

10. A method for securing a movable carriage in an image forming apparatus, the image forming apparatus including a frame and a unit openable with respect to the frame, the method comprising:
provided a securing component having an engaging portion with which a first portion formed on the frame engages;
when the unit is open, placing the securing component such that the securing component is fixed to the carriage and the engaging portion engages with the first portion; and
closing the unit such that a second portion formed on the unit engages with the first portion to hold the engaging portion.

11. The method according to claim 10, wherein the securing component has a structure in which a sheet material is bent along a bending line, and
wherein a direction in which the bending line extends is substantially parallel with a direction in which the carriage moves, in such a state that the securing component secures the carriage.

12. The method according to claim 10, wherein, when the unit is closed, the securing component is pressed against the carriage by a pressing portion formed on the unit.

* * * * *